(12) United States Patent
Kotamarthi et al.

(10) Patent No.: US 8,584,118 B2
(45) Date of Patent: *Nov. 12, 2013

(54) TERMINAL, METHOD AND COMPUTER PROGRAM PRODUCT FOR VALIDATING A SOFTWARE APPLICATION

(75) Inventors: Padmajabala Kotamarthi, North Chemsford, MA (US); Ram Gopal Lakshmi Narayanan, Hudson, NH (US)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,473

(22) Filed: Apr. 9, 2012

(65) Prior Publication Data

US 2012/0198437 A1 Aug. 2, 2012

Related U.S. Application Data

(63) Continuation of application No. 10/969,145, filed on Oct. 20, 2004, now Pat. No. 8,156,488.

(51) Int. Cl.
*G06F 9/445* (2006.01)
*H04L 9/32* (2006.01)

(52) U.S. Cl.
USPC ........... 717/174; 717/176; 717/177; 717/178; 713/176

(58) Field of Classification Search
None
See application file for complete search history.

(56) References Cited

U.S. PATENT DOCUMENTS

| | | | |
|---|---|---|---|
| 5,937,159 A | 8/1999 | Meyers et al. | |
| 6,149,522 A | 11/2000 | Alcorn et al. | |
| 6,289,462 B1 | 9/2001 | McNabb et al. | |
| 6,463,535 B1 | 10/2002 | Drews | |
| 6,651,169 B1 * | 11/2003 | Benson et al. | 713/193 |
| 6,865,737 B1 * | 3/2005 | Lucas et al. | 717/178 |
| 6,993,664 B2 | 1/2006 | Padole et al. | |
| 7,237,122 B2 | 6/2007 | Kadam et al. | |
| 7,376,947 B2 | 5/2008 | Evers | |
| 7,461,249 B1 | 12/2008 | Pearson et al. | |
| 7,493,614 B2 * | 2/2009 | Liu et al. | 717/175 |

(Continued)

FOREIGN PATENT DOCUMENTS

| | | |
|---|---|---|
| CN | 1361882 A | 7/2002 |
| CN | 1512429 A | 7/2004 |

(Continued)

OTHER PUBLICATIONS

*Nokia and Symbian OS*—White Paper; Jun. 2002; 12 pages; Nokia Mobile Phones, Nokia Corporation, Nokia Group, Finland.

(Continued)

*Primary Examiner* — Insun Kang
(74) *Attorney, Agent, or Firm* — Alston & Bird LLP (57) ABSTRACT

A terminal for validating a software application includes a processor capable of operating an operating system (OS) platform (e.g., Symbian™ OS platform), and capable of operating at least one software application above the OS platform. The software application(s) are associated with a permission record that includes permissions identifying services the software application is authorized to receive from the OS platform. The OS platform is capable of receiving a request, from a software application, for a service of the OS platform. The OS platform can determine if the software application is authorized to receive the requested service based upon the associated permission record. And if the software application is authorized, the OS platform is capable of providing the requested service to the software application.

20 Claims, 5 Drawing Sheets

(56) References Cited

U.S. PATENT DOCUMENTS

| | | | |
|---|---|---|---|
| 7,530,094 B2 | | 5/2009 | Philips et al. |
| 7,634,772 B2 * | | 12/2009 | Parthasarathy et al. ....... 717/178 |
| 7,743,145 B2 | | 6/2010 | Kaler et al. |
| 7,885,896 B2 | | 2/2011 | Lenard et al. |
| 7,890,428 B2 | | 2/2011 | Brooks et al. |
| 7,890,950 B1 | | 2/2011 | Nanavati et al. |
| 8,209,680 B1 * | | 6/2012 | Le et al. ........................ 717/174 |
| 2002/0107809 A1 | | 8/2002 | Biddle et al. |
| 2003/0056102 A1 | | 3/2003 | Aho et al. |
| 2003/0149897 A1 | | 8/2003 | Ylitalo et al. |
| 2003/0154397 A1 | | 8/2003 | Larsen |
| 2003/0221024 A1 | | 11/2003 | Arroyo et al. |
| 2004/0128515 A1 | | 7/2004 | Rabin et al. |
| 2004/0185872 A1 | | 9/2004 | Emmerson et al. |
| 2005/0066324 A1 | | 3/2005 | Delgado et al. |
| 2005/0188369 A1 | | 8/2005 | Evers |
| 2005/0278716 A1 | | 12/2005 | Koppen et al. |
| 2006/0150246 A1 * | | 7/2006 | Kamada et al. ................. 726/17 |
| 2006/0168580 A1 * | | 7/2006 | Harada et al. ................. 717/174 |
| 2006/0230397 A1 | | 10/2006 | Cook et al. |
| 2007/0226805 A1 | | 9/2007 | Jeal et al. |

FOREIGN PATENT DOCUMENTS

| | | |
|---|---|---|
| EP | 1 349 033 B1 | 3/2004 |
| EP | 1 465 041 A2 | 10/2004 |
| WO | WO 00/21238 A1 | 4/2000 |
| WO | WO 02/08873 A1 | 1/2002 |
| WO | WO 03/003170 A1 | 1/2003 |
| WO | WO 03/107201 A1 | 12/2003 |

OTHER PUBLICATIONS

*Series 60 Developer Platform: Introductory White Paper*; Jun. 2004; 19 pages; Version 1.1; Nokia Corporation.

Kevin Dixon; *Symbian OS Version 7.0s—Functional Description*; Jun. 2003; 29 pages; Revision 2.1; Symbian Ltd.

Sander Siezen; *Symbian OS Version 8.0—Product Description*; Feb. 2004; 30 pages; Revision 2.1; Symbian Ltd.

Nordquist et al., License tracking in free, open, and proprietary software, Dec. 2003, pp. 101-112, http://delivery.acm.org/10.1145/950000/948802/p101-nordquist.pdf.

Zhang et al., The optimal software licensing policy under quality uncertainty, Sep. 2003, pp. 276-286, http://delivery.acm.org/10.1145/950000/948042/p276-seidmann.pdf.

Supplementary European Search Report for Application No. 05818855.8 dated Jul. 13, 2012.

*Mobile Information Device Profile for Java™ 2 Micro Edition*, Version 2.0, JSR 118 Expert Group, Java Community Process, Nov. 5, 2002, pp. 1-34.

*MIDP 2.0: Tutorial on Signed MIDlets*, Version 1, Forum Nokia, May 19, 2004, 23 pages.

*OMA DRM Specification V 2.0*, Open Mobile Alliance Ltd., Mar. 20, 2004, 125 pages.

Edney, J., et al.; "*Real 802.11 Security: Wi-Fi Protected Access and 802.11i;*" Addison-Wesley publication; 2004.

Google Directory: Products; originally retrieved from <http://directory.google.com/Top/Computers/Security/Anti_Virus/Products/>; presently retrieved from <http://web.archive.org/web/20040215030031/http://directory.google.com/Top/Computers/Security/Anti_Virus/Products/> on Apr. 30, 2013.

"*Security-Enhanced Linux*;" National Security Agency—Central Security Service; originally retrieved from <http://www.nsa.gov/selinux/index.cfm>; presently retrieved from <http://web.archive.org/web/20081227093019/http://www.nsa.gov/selinux/index.cfm> on Apr. 30, 2013.

"*Services: Increase the Value of Email*;" Postini; originally retrieved from <http://www.postini.com/services/>; presently retrieved from <http://web.archive.org/web/20010501233449/http://www.postini.com/services/> on Apr. 30, 2013.

Trilling, S.; "*The Truth About Viruses*;" techtv; originally retrieved from <http://www.techtv.com/callforhelp/print/0,23102,2299914,00.html>; presently retrieved from <http://web.archive.org/web/20040409030237/http://www.techtv.com/callforhelp/print/0,23102,2299914,00.html> on Apr. 30, 2013.

"*TrustedBSD Project*;" The TrustedBSD Project; retrieved on Apr. 30, 2013 from <http://www.trustedbsd.org>.

Trusted Computing Platform Alliance; originally retrieved from <http://www.trustedcomputing.org/home>; presently retrieved from <http://web.archive.org/web/20030810084345/http://www.trustedcomputing.org/home/> on Apr. 30, 2013.

* cited by examiner

TERMINAL, METHOD AND COMPUTER PROGRAM PRODUCT FOR VALIDATING A SOFTWARE APPLICATION

CROSS REFERENCE TO RELATED APPLICATIONS

This application is a continuation of U.S. application Ser. No. 10/969,145, filed on Oct. 20, 2004 and issued as U.S. Pat. No. 8,156,488, and is incorporated in its entirety herein by reference.

FIELD

The present invention generally relates to terminals and methods of validating a software application and, more particularly, relates to terminals, methods, and computer program products for validating software applications in a mobile terminal operating system environment.

BACKGROUND

As is well known, various user equipment, including computers (fixed or portable), mobile telephones, personal data assistants (PDA's), organizers and the like, can be used to communicate with other user equipment in a communication system or to access the Internet to obtain services. Mobile user equipment is often referred to as a mobile terminal, and can be defined as a means which is capable of communication via a wireless interface with another device such as a base station of a mobile telecommunication network or any other station, including other mobile terminals. Such terminals can be adapted for voice, text message or data communication via the wireless interface.

As digital convergence reshapes the way businesses and users use and share information, a merging of digital communication technology, digital media and computing is taking place. And user equipment is being developed to enable users to access the facilities provided by such convergence. In this regard, so-called high-end mobile phones (or smart phones or communicators) are examples of mobile terminals that have been developed to fulfill this requirement. These mobile phones not only perform functions of a conventional mobile telephone, but may also perform functions previously limited to personal computers, personal digital assistants or the like. For example, a number of these mobile phones include functionality to install or load third party software into the mobile phones.

As is also well known to those skilled in the art, various pieces of software may be malicious in the guise of viruses, Trojan horses or some other element introduced by a hacker in order to abuse the mobile phone or otherwise gain access to functionality of the mobile phone. It is well known that personal computers (PCs) are susceptible to such problems, and solutions have been proposed in the field of personal computing to overcome them, including implementing detailed security measures to prevent, detect and/or respond to the security risks posed by such malicious software. However, the open operating systems of most of the mobile devices, such as the current Symbian™ operating system (OS), do not provide a fine grained security model for overcoming the security risk. Furthermore various solutions that have been proposed are application-level solutions which are software based, and as such, can be bypassed by a sophisticated programmer.

SUMMARY

In light of the foregoing background, embodiments of the present invention provide an improved terminal, method and computer program product for validating a software application. In accordance with embodiments of the present invention, a security framework is provided whereby the authenticity, integrity and/or authority of applications received by the terminal may be checked before installing, loading and/or providing services to those applications. More particularly, for example, applications installed or otherwise loaded onto a terminal are associated with permission records that identify services the applications are permitted to receive from an OS platform operating below the applications, including, for example, operations the applications are permitted to perform within the OS platform. Then, when an application requests a service provided by the OS platform, authority of the application to receive the service can be verified based upon the permission record associated with the respective application before the application receives the requested service. Thus, unauthorized applications, such as malicious applications, may be prevented from accessing services for which the respective applications do not have express authority to access, as identified in the permission records.

According to one aspect of the present invention, a terminal is provided for validating a software application. The terminal includes a processor capable of operating an operating system (OS) platform (e.g., Symbian™ OS platform), and capable of operating at least one software application above the OS platform. The software application(s) are associated with a permission record that includes permissions identifying services the software application is authorized to receive from the OS platform. The OS platform is capable of receiving a request, from a software application, for a service of the OS platform. The OS platform, or a verification module of the OS platform, can verify the authority of the software application by determining if the software application is authorized to receive the requested service based upon the associated permission record. And if the software application is authorized, the OS platform is capable of providing the requested service to the software application.

The terminal can be capable of receiving a plurality of requests from the software application for at least one service of the OS platform. For each requested service, then, the OS platform can be capable of determining if the software application is authorized to receive the requested service based upon the associated permission record. The OS platform can then provide, to the software application, those services for which the software application is authorized.

In addition to verifying the authority of the software application, the OS platform can be further capable of verifying an authenticity of the software application. More particularly, the OS platform or an installer application of the OS platform can be capable of verifying the authenticity of the software application based upon a source of the software application, where the software application has previously been received from the source. Irrespective of how the OS platform verifies the authenticity of the software application, however, the OS platform can thereafter install the software application for operation on the terminal if the authenticity of the software application is verified. In such instances, the OS platform can be capable of verifying the authenticity and installing the software application before receiving a request from the software application for a service of the OS platform. After verifying the authenticity of the application, however, the OS platform can be further capable of creating the permission record for the software application if the authenticity of the software application is verified, and thereafter storing the permission record in a policy database of the OS platform.

Further, the OS platform can be further capable of initiating loading of the software application, and verifying an integrity of the software application before loading the software application. In this regard, the permission record associated with the software application can further include a signature associated with the software application. In such instances, the OS platform can be capable of verifying the integrity of the software application by generating a verification signature based upon the software application, comparing the verification signature with the signature in the permission record associated with the software application, and thereafter verifying the integrity of the software application based upon the comparison. Irrespective of how the integrity of the software application is verified, however, the OS platform or a loader application of the OS platform can load the software application for operation on the terminal if the integrity of the software application is verified. Then, after loading the software application, the OS platform can receive a request from the software application for a service of the OS platform.

According to other aspects of the present invention, a method and computer program product are provided for validating a software application. Embodiments of the present invention therefore provide an improved terminal, method and computer program product for validating a software application. As indicated above, and explained below, embodiments of the present invention provide a security framework whereby the authority of a software application to receive a service is verified before providing that service to the software application. Also in accordance with embodiments of the present invention, the authenticity of the software application may be verified before installing the software application for operation on the terminal. In addition, the integrity of the software application may be verified before loading the software application for operation on the terminal, in accordance with embodiments of the present invention. As such, the terminal, method and computer program product of embodiments of the present invention solve the problems identified by prior techniques and provide additional advantages.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
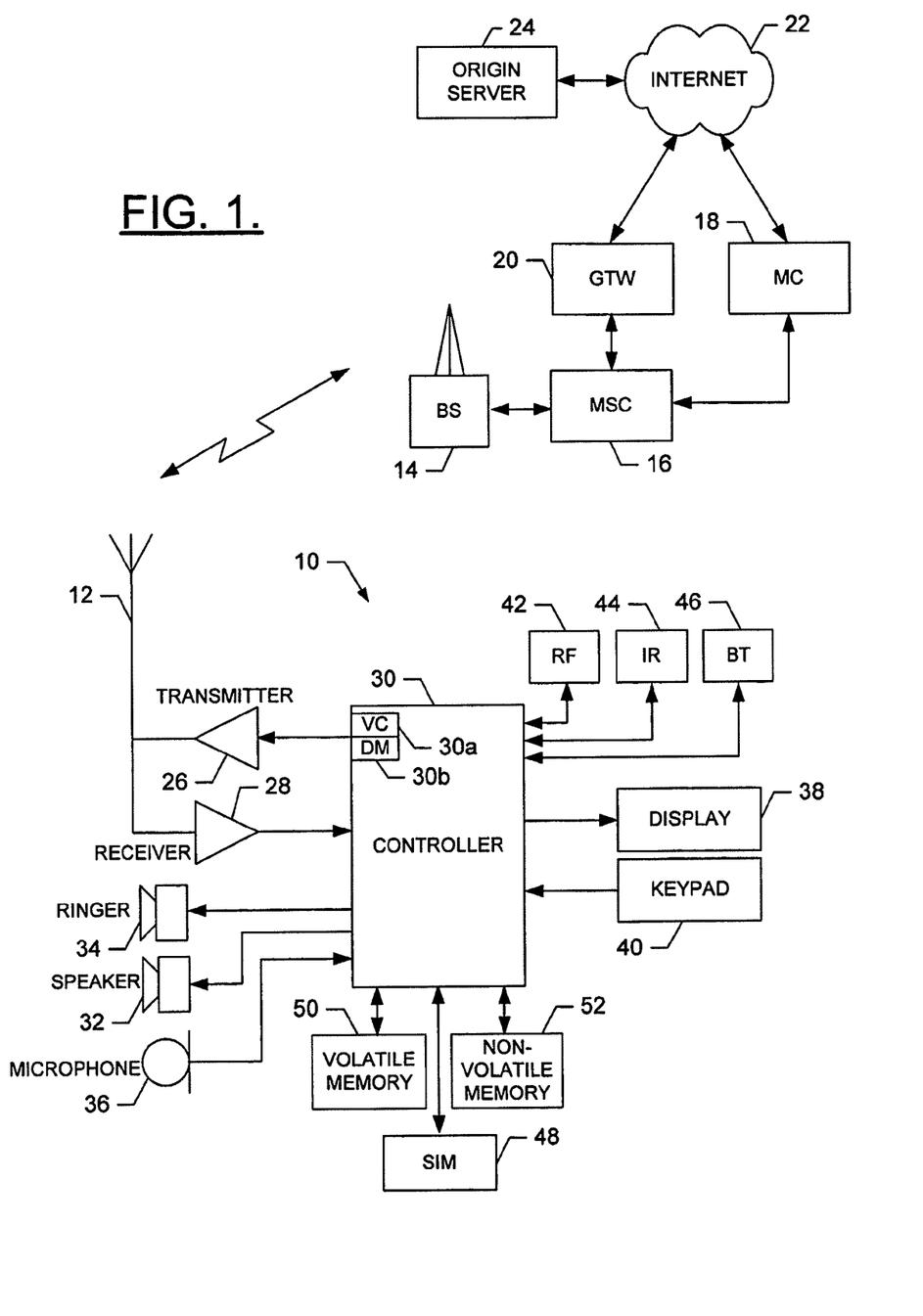
FIG. 1 is a block diagram of one type of terminal and system that would benefit from embodiments of the present invention.

Referring to FIG. 1, an illustration of one type of system and terminal that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

Also, it should be understood that while the terminal may be illustrated and hereinafter described as comprising a mobile telephone, mobile telephones are merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

As shown, the system can include a number of the same or different terminals 10 (one shown). Each terminal may have an antenna 12 for transmitting signals to and for receiving signals from a base site or base station (BS) 14. The base station is a part of one or more cellular or mobile networks that each include elements required to operate the network, such as a mobile switching center (MSC) 16. As well known to those skilled in the art, the mobile network may also be referred to as a Base Station/MSC/Interworking function (BMI). In operation, the MSC is capable of routing calls, data or the like to and from terminals when those terminals are making and receiving calls, data or the like. The MSC can also provide a connection to landline trunks when terminals are involved in a call. In addition, the MSC can be capable of controlling the forwarding of messages to and from terminals, and can also control the forwarding of messages for such terminals to and from a messaging center (MC) 18, such as Short Messaging Service (SMS) messages to and from a SMS center (SMSC) and/or Multimedia Messaging Service (MMS) messages to and from a MMS center (MMSC).

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a gateway (GTW) 20, and the GTW is coupled to a WAN, such as the Internet 22. In turn, devices such as processing elements (e.g., personal computers, server computers or the like) can be coupled to the terminals 10 via the Internet (and/or directly via other means for sharing and/or obtaining data, as explained below). For example, as explained below, the processing elements can include one or more processing elements associated with one or more origin servers 24, one of which being illustrated in FIG. 1. The processing elements can comprise any of a number of processing devices, systems or the like capable of operating in accordance with embodiments of the present invention. In this regard, the processing elements can comprise, for example, server computer systems, desktop computer systems, laptop computer systems or the like.

Although not every element of every possible network is shown and described herein, it should be appreciated that the terminals 10 may be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. Additionally or alternatively, mobile network(s) can be capable of supporting communication in accordance with any one or more of a number of different digital broadcast networks, such as Digital Video Broadcasting (DVB) networks including DVB-T (DVB-Terrestrial) and/or DVB-H (DVB-Handheld), Integrated Services Digital Broadcasting (ISDB) networks including ISDB-T (ISDB-Terrestrial), or the like.

More particularly, for example, one or more terminals 10 may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode terminals (e.g., digital/analog or TDMA/CDMA/analog phones).

As shown, in addition to an antenna 12, the mobile terminal 10 can include a transmitter 26, receiver 28, and controller 30 or other processor that provides signals to and receives signals from the transmitter and receiver, respectively. These signals include signaling information in accordance with the air interface standard of the applicable cellular system, and also user speech and/or user generated data. In this regard, the terminal can be capable of operating with one or more air interface standards, communication protocols, modulation types, and access types. More particularly, the terminal can be capable of operating in accordance with any of a number of 1G, 2G, 2.5G and/or 3 G communication protocols or the like, such as any one or more of those indicated above.

It is understood that the controller 30 includes the circuitry required for implementing the audio and logic functions of the terminal 10. For example, the controller may be comprised of a digital signal processor device, a microprocessor device, and various analog-to-digital converters, digital-to-analog converters, and other support circuits. The control and signal processing functions of the terminal are allocated between these devices according to their respective capabilities. The controller can additionally include an internal voice coder (VC) 30a, and may include an internal data modem (DM) 30b. Further, the controller may include the functionality to operate one or more client software programs such as those indicated above, which may be stored in memory (described below).

The terminal 10 also comprises a user interface including a conventional earphone or speaker 32, a ringer 34, a microphone 36, a display 38, and a user input interface, all of which are coupled to the controller 30. Although not shown, the terminal can include a battery for powering the various circuits that are required to operate the terminal, as well as optionally providing mechanical vibration as a detectable output. The user input interface, which allows the terminal to receive data, can comprise any of a number of devices allowing the terminal to receive data, such as a keypad 40, a touch display (not shown) or other input device. In embodiments including a keypad, the keypad includes the conventional numeric (0-9) and related keys (#, *), and other keys used for operating the terminal.

The terminal 10 can also include one or more means for sharing and/or obtaining data. For example, the terminal can include a short-range radio frequency (RF) transceiver or interrogator 42 so that data can be shared with and/or obtained from electronic devices in accordance with RF techniques. The terminal can additionally, or alternatively, include other short-range transceivers, such as, for example an infrared (IR) transceiver 44, and/or a Bluetooth (BT) transceiver 46 operating using Bluetooth brand wireless technology developed by the Bluetooth Special Interest Group. The terminal can therefore additionally or alternatively be capable of transmitting data to and/or receiving data from electronic devices in accordance with such techniques. Although not shown, the terminal can additionally or alternatively be capable of transmitting and/or receiving data from electronic devices according to a number of different wireless networking techniques, including WLAN techniques such as IEEE 802.11 techniques or the like.

The terminal 10 can further include memory, such as a subscriber identity module (SIM) 48, a removable user identity module (R-UIM) or the like, which typically stores information elements related to a mobile subscriber. In addition to the SIM, the terminal can include other removable and/or fixed memory. In this regard, the terminal can include volatile memory 50, such as volatile Random Access Memory (RAM) including a cache area for the temporary storage of data. The terminal can also include other non-volatile memory 52, which can be embedded and/or may be removable. The non-volatile memory can additionally or alternatively comprise an EEPROM, flash memory or the like. The memories can store any of a number of software applications, instructions, pieces of information, and data, used by the terminal to implement the functions of the terminal.

As explained above, the terminal 10 may operate or otherwise run a number of different software applications including, for example, a WAP (Wireless Application Protocol) browser, MMS client, SMS client, email client, short-range connectivity OBEX (Object Exchange) engine, PC-connectivity, Bluetooth and IR stacks, PIM (personal information management) and telephony applications. Within the terminal, such applications typically run on top of an OS platform, such as that provided by the open-architecture Symbian™ Generic Technology (GT). As explained below, the operating system comprises the Symbian OS™. It should be understood, however, that the operating system can comprise any of a number of other operating systems capable of operating similar to the Symbian™ OS in accordance with embodiments of the present invention. For example, in lieu of the Symbian™ OS, applications may operate on top of operating systems such as Linux, Windows® CE or Palm OS®.

As will be appreciated, the Symbian™ GT is a common core of Symbian™ application programming interfaces (APIs) and operating system technology. It contains all of the interfaces to user interface (UI) applications, dynamic link libraries (DLLs), executables (EXEs) and device drivers for controlling various hardware devices of the terminal 10 including, for example, the ringer 34, display 38, keypad 40 and, as applicable, the RF transceiver 42, IR transceiver 44 and/or Bluetooth transceiver 46. In addition, the Symbian™

GT communicates with the terminal's core cellular software through a well-defined and documented messaging architecture.

Figure 2:
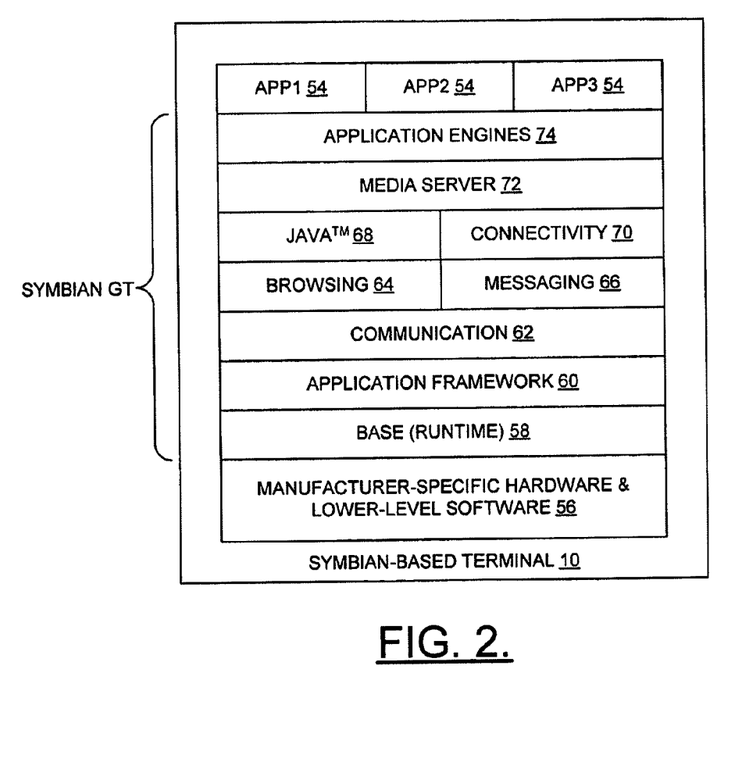
FIG. 2 is a schematic block diagram of an operating system platform between an application layer platform and a manufacturer-specific hardware at a lower layer.

Reference is now made to FIG. 2, which illustrates an architecture diagram of the Symbian™ OS GT operating on top of a number of applications 54 (e.g., application 1, application 2, application 3, etc.) onboard a Symbian™-based terminal 10. The Symbian™ OS GT is shown on top of terminal hardware (see FIG. 1) and lower-level software 56. As is well known, the Symbian™ OS GT comprises a number of subsystems that conceptually divide the APIs and operating system technology provided by the Symbian™ GT into those of related functionality. In this regard, as shown, the Symbian™ GT includes a base subsystem 58, an application framework subsystem 60, communication infrastructure subsystem 62, browsing subsystem 64, messaging framework subsystem 66, Java™ subsystem 68, connectivity subsystem 70, multimedia framework subsystem 72 and application engines 74.

Briefly, the base subsystem 58 of the Symbian™ GT architecture provides the programming framework for the other components of the Symbian™ GT architecture. In this regard, the base subsystem includes the OS system kernel, which employs a micro-kernel architecture in which a minimal functional core is separate from one or more extended functionalities and/or customer-specific components. In addition to the micro-kernel, the base subsystem includes a user library, as well as the file server which provides shared access to filing systems.

The application framework subsystem 60 includes middleware APIs for services and components such as data management, text handling, clipboard, resource file support internationalization and core graphical UI (GUI) components. To implement such services, then, the application framework subsystem includes sub-subsystems such as an application architecture, window server, view server and GUI component framework.

The communication infrastructure subsystem 62 provides frameworks and services for communications and networking within the Symbian™ GT architecture. The communication infrastructure subsystem may include or otherwise be associated with servers such as a communications server, socket server and telephony server. The communications, socket and telephony servers, in turn, provide support for a number of communication technologies and protocols including, for example, Transmission Control Protocol/Internet Protocol (TCP/IP), GSM, CDMA, Wireless Application Protocol (WAP), as well as serial communications, and short-range communications such as infrared and Bluetooth.

The browsing subsystem 64 of the Symbian™ GT architecture includes browsers for communicating in accordance with the Wireless Markup Language (WML) for WAP services, and Hypertext Markup Language (HTML) for World Wide Web (WWW) services. The messaging framework subsystem 66 is based upon a messaging server, and provides support for sending and receiving a number of different types of messages including, for example, text messages, SMS messages, Enhanced Messaging Service (EMS) messages, MMS and email messages.

The Java™ subsystem 68 of the Symbian™ GT architecture provides support for Java™ services within the Java™ 2 Micro Edition (J2ME) framework. The connectivity subsystem 70 provides for personal area networking (PAN) connectivity via a number of different communication means including, for example, Bluetooth, serial Universal Serial Bus (USB), infrared and Ethernet means. The multimedia framework subsystem 72 includes a media server, and provides a number of multimedia capabilities including, for example, audio and video recording and playback, audio streaming functionality, and imaging functionality. And the application engines 74 provide the core functionality for standard Symbian™ applications. In this regard, the application engines can include agenda (schedule), to-do, contacts, alarm and world servers, as well as a help engine.

As will be appreciated, then, operating systems such as the Symbian™ OS include an extensive collection of libraries or DLLs for implementing a number of different standards including, networking, communication, messaging, browsing, telephony, and multimedia standards. Access to the services and resources of the operating system, however, may be implemented by service providers through a client-server framework. In such a framework, a client program (e.g., application 54) requests and receives services provided by a server (e.g., file server, window server, view server, communications server, socket server and telephony server, messaging server, media server, agenda (schedule) server, to-do server, contacts server, alarm server, world server, etc.). The requests are received by means of an API defined by the server for receiving such requests. The client and server communicate in accordance with a message passing protocol, where the communication is mediated by the OS system kernel of the base subsystem 58.

To request/provide services, a client and server communicate by means of a channel of communication, often referred to as a session. In this regard, a client sends a message to a server over a session to request a service provided by the server, the message including a 32-bit request type code and up to four 32-bit parameters, for example. The server can then service the request and return a result, such as a 32-bit result, to the client. In various instances, however, the server may be required to send and/or receive additional data to service the request. In such instances, the server may perform one or more read and/or write functions in accordance with inter-thread data transfer services before returning the result to complete service of the request.

Figure 3:
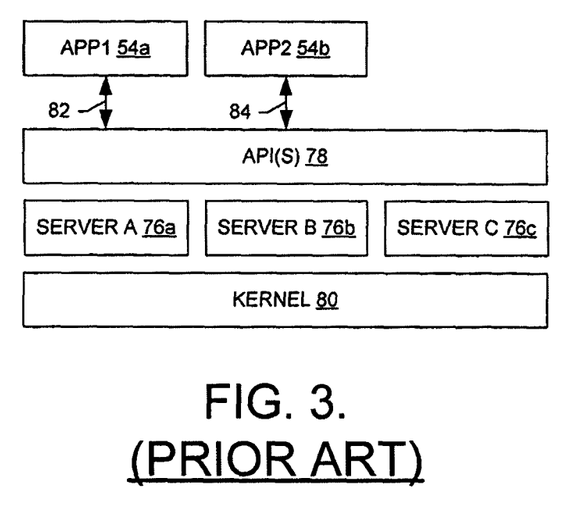
FIG. 3 is a schematic block diagram functionally illustrating two applications operating above an operating system platform in accordance with one conventional technique.

As explained in the background section, various software applications 54 may be malicious in the guise of viruses, Trojan horses or some other element introduced by a hacker in order to abuse the terminal 10 or otherwise gain access to functionality of the terminal. To more clearly illustrate this, consider two applications, namely application 1 (app 1) 54a and application 2 (app2) 54b, as illustrated in FIG. 3. As shown, the two applications operate on top of an OS platform (e.g., Symbian OS™), and receive services provided by one or more of servers, namely server A 76a, server B 76b and/or server C 76c. And as explained above with respect to the Symbian OS™, communication between the applications and the servers passes through respective APIs 78 of the OS platform, and is mediated by the kernel 80 of the OS.

In the example shown in FIG. 3, also consider that application 1 54a is operating in a proper manner, attempting to read and/or write files to memory (e.g., non-volatile memory 52) of the terminal 10, such as into a contact database or phonebook, as represented by session 82. Application 2 54b, on the other hand, is a malicious application, which the terminal user previously downloaded to the terminal. When launched for operation on the terminal, malicious application 2 may perform one or more improper functions. For example, malicious application 2 may read, write and/or delete files to and/or from memory of the terminal, and/or transfer one or more files to a remote device via a messaging technique (e.g., text messaging, SMS, EMS, MMS, email, etc.), as represented by session 84. In this scenario, application 2 may compromise user trust and privacy by performing undesirable functions, which can result in personal and/or financial loss for the terminal user.

To overcome the drawbacks associated with the scenario of FIG. 3 (i.e., malicious programs obtaining services of the OS platform of the terminal 10), embodiments of the present invention provide a security framework whereby each application 54 installed or otherwise loaded onto the terminal is associated with a permission record that identifies one or more services the application is permitted to receive from the OS platform. Then, when an application requests a service provided by the OS platform, the permission record can be checked to determine if the application is authorized to receive the requested service. If the application is authorized, the OS platform can proceed to provide the requested service to the application. Otherwise, the application may be prevented from receiving the requested service.

Figure 4:
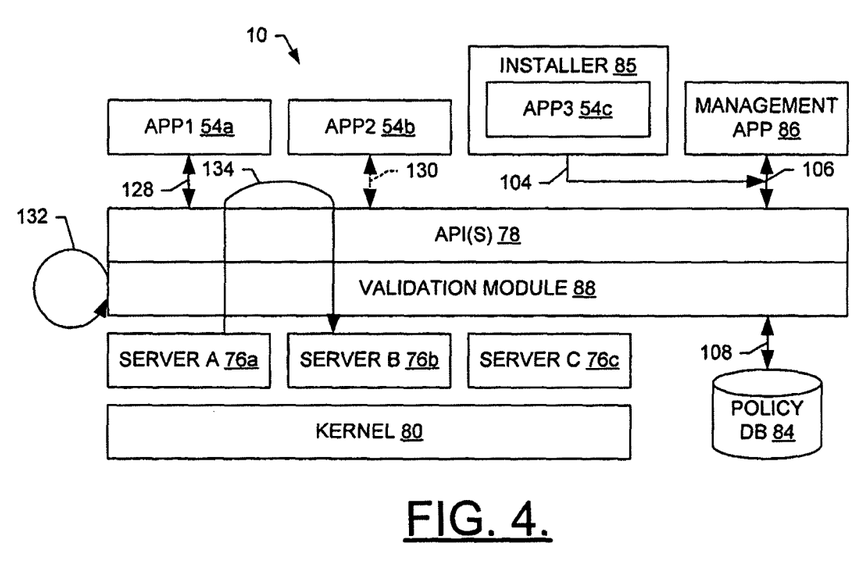
FIG. 4 is a schematic block diagram functionally illustrating two applications operating above an operating system platform in accordance with one embodiment of the present invention.
Figure 5:
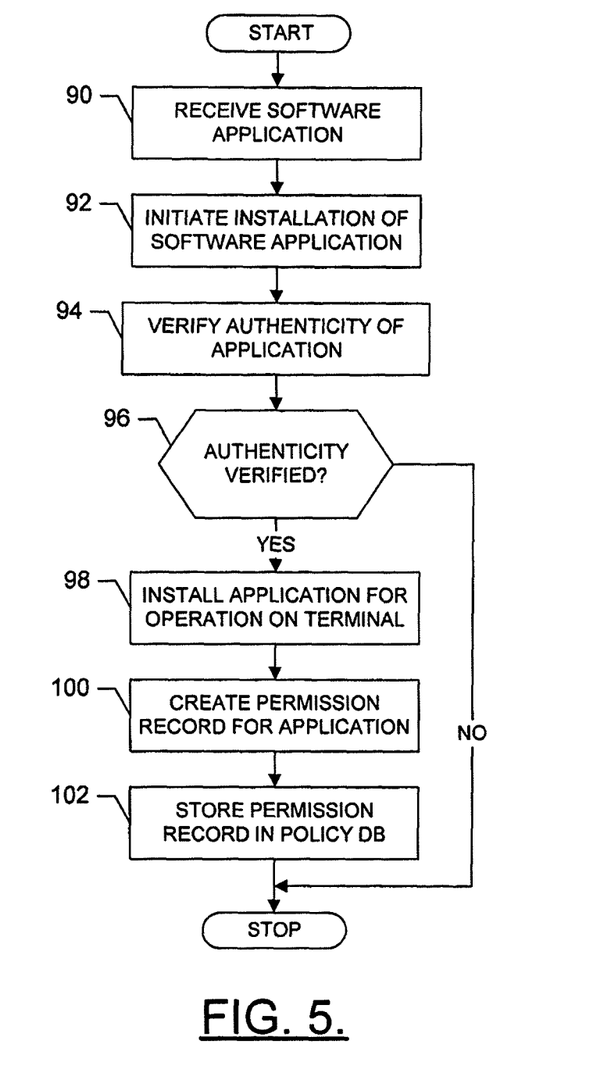
FIGS. 5, 6a and 6b are flowcharts illustrating various steps in a method of validating a software application, in accordance with one embodiment of the present invention.
Figure 6A:
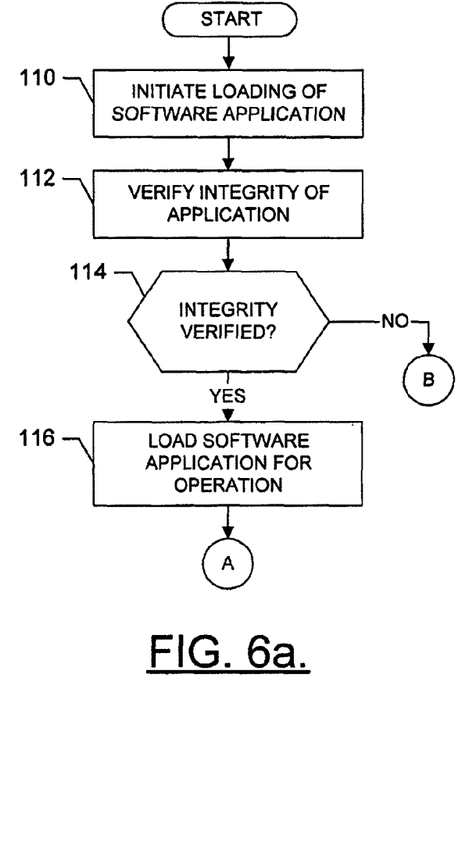
Figure 6B:
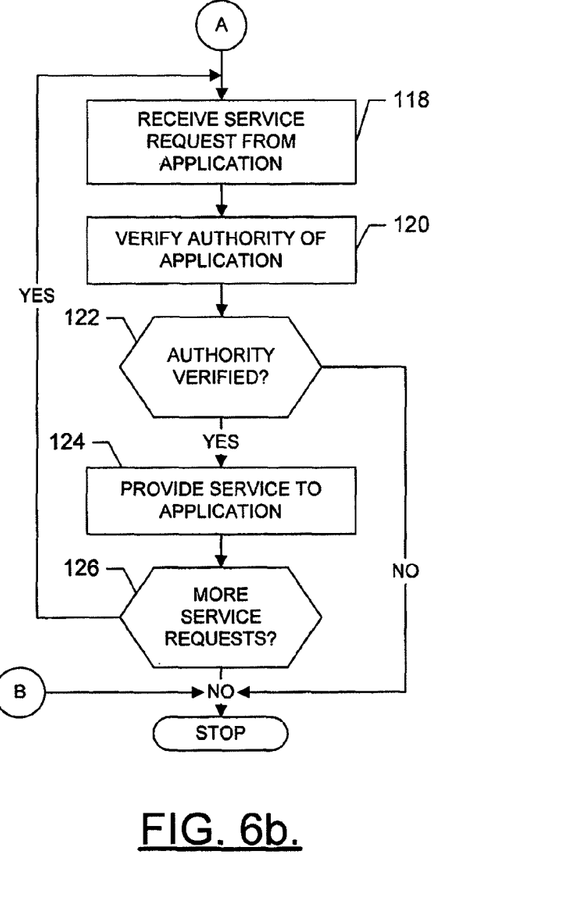

Reference is now made to FIGS. 4, 5, and 6a and 6b, which illustrate embodiments of the present invention. More particularly, FIG. 4 is a functional block diagram of applications operating on top of an OS platform, in accordance with one embodiment of the present invention. FIGS. 5 and 6a and 6b are flowcharts including various steps in validating a software application 54, also in accordance with one embodiment of the present invention.

As shown in FIG. 4 and explained below, in contrast to the block diagram of a conventional terminal as shown in FIG. 3, the terminal 10 of embodiments of the present invention further includes an installer application 85 which, as part of the OS platform, is adapted to validate applications received by the terminal, and if validated, install such applications onto the terminal, and create permission records for such applications. In this regard, the terminal of embodiments of the present invention also includes a policy database (DB) 84 for storing the permission records created by the terminal. In addition, the terminal includes a management application 86 for confirming, adding, deleting, overriding or otherwise modifying one or more permissions in the permission records of one or more applications. Further, the terminal includes a validation module 88, integrated or otherwise associated with the API(s) 78, for determining if applications requesting services provided by the OS platform are authorized to receive those services, the validation module determining the authority of the applications based upon respective permission records in the policy database.

As shown in block 90 of FIG. 5, a method of validating a software application 54 includes the terminal 10 receiving a software application, such as application 3 54c as shown in FIG. 4. The terminal can receive the software application in any of a number of different manners. For example, the terminal can download the software application from an origin server 24 across the Internet 22 and one or more cellular or mobile networks (see FIG. 1). Irrespective of how the terminal receives the software application, the software application may be stored in memory of the terminal (e.g., SIM 48, volatile memory 50, non-volatile memory 52, etc.). Then, after receiving and storing the software application, installation of the software application for operation on the terminal is initiated, such as by a terminal user directing the installer application 85 to install the software application, as shown in block 92.

After installation of the software application 54 is initiated, but before the software application is installed, the installer application 85 attempts to verify the authenticity of the software application, as shown in blocks 94 and 96. For example, the installer application can verify the authenticity of the source (e.g., an origin server 24) of the software application to thereby verify the authenticity of the software application. In this regard, the authenticity of the software application can be verified in any of a number of different manners, such as by checking a cryptographic checksum (e.g., GNU Privacy Guard (GPG) signature). If the installer application fails to verify the authenticity of the software application, the installer application may prevent installation of the software application.

If the installer application 85 verifies the authenticity of the software application 54, the installer application installs the software application for operation on the terminal, as shown in block 98. Also after verifying the authenticity of the software application, the installer application creates a permission record for the software application, as shown in block 100. Then, as illustrated in block 102, the permission record can then be stored as an entry in a policy database 84 that resides inside the kernel space of the OS platform, as represented by the session shown as 104 and 108. In this regard, the policy database can have access restricted to only specified applications, which may be authorized to read and/or write to the policy database.

The installer application 85 can create the permission record, or more particularly determine the permissions included in the permission record, in any of a number of different manners. For example, the installer application may be configured to include one or more default permissions in each permission record, or in each permission record of one or more particular types of software applications 54. Additionally or alternatively, for example, the installer application may receive one or more permissions from the software application itself, such as in a "permissions.ini" file. In such instances, the installer application may request, such as from a terminal user, confirmation of one or more of the received permissions before inserting those permissions into the permission record. For example, presume that the software application includes one or more permissions authorizing the software application to perform one or more operations using I/O interfaces (e.g., transmitter 26, receiver 28, RF transceiver 42, IR transceiver 44, Bluetooth transceiver 46, etc.) of the terminal 10. In such an instance, the installer application may notify the terminal user of one or more of the permissions authorizing use of the terminal I/O interfaces and request that the terminal user confirm or deny those permissions, such as via a management application 86 as explained below.

Further, for example, the terminal user may operate a management application 86 before, as or after the installer application 85 installs the software application 54 to confirm, add, delete, override or otherwise modify one or more permissions in the permission records of one or more software applications, as represented by the session shown as 106 and 108. In this regard, in addition to confirming permissions provided by a software application being installed, the terminal user may operate the management application to set, reset or otherwise modify one or more default permissions included in one or more permission records. Also, for example, the terminal user may operate the management application to override or otherwise modify permissions provided by the software application, or set as default permissions. Further, for example, the terminal user may operate the management application to add and/or delete permissions from the default permissions, or from one or more permission records, such as permissions related to socket and/or I/O access control.

As indicated above, the permission record directly or indirectly identifies one or more services the application is permitted to receive from the OS platform, including operations the software application 54 is authorized to perform with respect to the OS platform. In this regard, the permission record may identify one or more permissions associated with the respective software application with respect to the OS platform of the terminal 10. For example, a permission record for a software application (e.g., application 3 54*c*) may identify one or more files the respective software application is authorized to read, input/output (I/O) operations the software application may perform and/or what inter-process communication (IPC) the software application may utilize to communicate with one or more processes, and one or more types of temporary files the software application is authorized to create, as well as when and to where the software application is authorized to create the temporary files. More particularly, for example, a permission record for application 3 may read as follows:

Program Name—Application 3
File access:
Contact.db (R+)—No create, delete;
Temp.txt (R, W)—Create, delete
Consol access: Yes In the preceding permission file, application 3 has file access to the contact database (contact.db) in memory (e.g., non-volatile memory 52) of the terminal 10, as well as access to create temporary text files (temp.txt). More particularly, application 3 has read-only (R+) access to the contact database without authorization to create or delete entries in the contact database, but has read/write (R, W) access to create temporary text files with authorization to create and delete temporary text files. Further, in addition to file access, application 3 has authorization to access the consol of the terminal (e.g., display 38, keypad 40, etc.).

In addition to one or more permissions, the permission record can further include one or more additional pieces of information related to the respective software application 54. For example, the permission record can identify the source (e.g., an origin server 24) of the software application, as well as when the terminal 10 received the software application from the source, and/or where in memory (e.g., non-volatile memory 52) the software application is stored. Also, for example, the permission record can store, for the software application, a signature that can be generated or otherwise received by the installer application 85. In this regard, the signature can comprise any of a number of different values, strings or the like, such as a hash of the file name of the software application, by which the integrity of the software application may be verified, as explained below.

At one or more instances after installing the software application 54, and creating/storing a permission record for the software application, the software application may be loaded or otherwise executed for operation on the terminal 10. Alternatively, in various instances an application may be configured to be loaded or otherwise executed for operation on the terminal without first being separately installed. Even in such instances, however, the application may be processed by the installer application 85, such as to create and store a permission record for the application, before first loading or otherwise executing the application for operation on the terminal. Generally, then, after the application is configured to be loaded or otherwise executed for operation on the terminal, at one or more instances, a program loader included within or otherwise associated with the OS platform initiates or is directed to load the software application for operation, as shown in block 110 of FIG. 6*a*. Then, the program loader attempts to verify the integrity of the software application, as shown in blocks 112 and 114.

The program loader can verify the integrity of the software application 66 in any of a number of different manners to check that the software application is intact and has not been otherwise modified within memory (e.g., non-volatile memory 52) of the terminal. For example, the program loader can verify the integrity of the software application by generating a verification signature (e.g., hash of the file name) for the software application. The verification signature can then be compared with the signature in the permission record of the software application stored in the policy database 84. If the verification signature substantially, if not entirely, matches the signature in the permission record, the program loader verifies the integrity of the software application. Otherwise, the program loader has failed to verify the integrity of the software application and may prevent the software application from being loaded for operation.

If the program loader verifies the integrity of the software application 54, the program loader loads the software application for operation on the terminal 10, as shown in block 116. Thereafter, at one or more instances during operation of the software application, the software application may request one or more services provided by the OS platform, the services oftentimes being provided by a server 76 and mediated by the kernel 80 of the OS. In such instances, as illustrated in block 118 of FIG. 6*b*, the application sends a service request to a respective server by means of an API 78 defined by the server for receiving such requests, as represented by sessions 128 and 130 with respect to application 1 54*a* and application 2 54*b*, respectively.

Upon receipt of the request by the API 78, but before passing the request to the respective server, the API directs the validation module 88 to attempt to verify the authority of the requesting application 54 to receive the requested service, as illustrated in blocks 120 and 122. In this regard, the validation module loads the permission record for the requesting application from the policy database 84 into system memory (e.g., volatile memory 50) of the terminal 10. From the permission record, then, the validation module determines if the requesting application is authorized to receive the requested service based upon the permissions included in the permission record. For example, presume that an application requests to read from the contact database. In such an instance, the validation module may determine if the requesting application is authorized to read from the contact database by searching the respective permission record for a permission authorizing the application to read from the contact database (e.g., File access: Contact.db (R+)).

If the validation module fails to verify the authority of the application to receive the requested service, the validation module prevents the application from receiving the requested service, such as by preventing the service request from reaching the respective server. Additionally, if so desired, a log may be generated and stored in memory (e.g., non-volatile memory 52) of the terminal, such as by the kernel 80 of the OS. In this regard, the log may identify a number of different pieces of information such as, for example, the requesting application, the requested service and/or the time/date the requesting application requested the service.

If the validation module 88 verifies the authority of the application 54 to receive the requested service, on the other hand, the validation module passes, or directs the respective API 78 to pass, the service request to the respective server 76. Thereafter, as illustrated in block 124, if the server is permitted to receive, and receives, the service request, the server provides the requested service to the application, as also represented by sessions 128 and 130 with respect to application 1 54*a* and application 2 54*b*, respectively.

At one or more instances during operation of the application, the same application 54 may request the same service or different service from the same server or different servers, as shown in block 126. For each service, then, the API 78 receives the request, directs the validation module 88 to attempt to verify the application to receive the requested service, and if verified, passes the request to the respective server such that the respective server provides the requested service. To improve efficiency in verifying the authority of, and providing, subsequent services to an application, the permission record of the requesting application may be maintained in system memory (e.g., volatile memory 50) of the terminal 10, such as until the respective application is closed, as represented by session 132. Thus, the validation module may verify the authority of the application based upon the permission record maintained in system memory for subsequent requests, as opposed to loading the permission record from the policy database 84.

As explained above, an application 54 requests a service from a server 76 adapted to provide the requested service. In one or more instances, however, a base server (e.g., server A 76a) receiving the service request from an application may, in turn, request a service from one or more subsequent servers (e.g., server B 76b) on behalf of the requesting application. The service requested by the base server on behalf of the application can then be provided to the application from the subsequent servers. In such instances, authority of the application to receive the requested service can be verified with respect to the service requested from the base server (see blocks 120 and 122). In response to receipt of the service request, the base server can request a service from a subsequent server on behalf of the requesting application, the request from the base server being sent over a session via a respective API 78 defined by the subsequent server, as represented by session 134 between server A (i.e., base server) and server B (i.e., subsequent server) in FIG. 4.

When a service request is sent from a server 76 or another trusted component, such as another component of the OS platform, via an API 78, the API may be configured to pass the request to a respective server without directing the validation module 88 to attempt to verify the server to receive the requested service, even considering that the service will be provided to the requesting application 54. Alternatively, each component of the OS platform may also be associated with a permission record. In such instances, the authority of the server may be verified, such as in the same manner as applications, although components of the OS platform may more typically be considered trusted components with unrestricted access to services and resources of the OS platform. Irrespective of exactly how the request is passed from the base server to the subsequent server, the subsequent server can thereafter provide the requested service to the requesting application, as opposed to the requesting base server (although the service may be provided to the requesting application back through the base server).

To further illustrate benefits of embodiments of the present invention, again consider two applications, namely application 1 (app1) 54a and application 2 (app2) 54b, as illustrated in FIG. 4. As shown, as in FIG. 3, the two applications of FIG. 4 operate on top of an OS platform (e.g., Symbian OS™), and receive services provided by one or more of servers, namely server A 76a, server B 76b and/or server C 76c. And as explained above with respect to the Symbian OS™, communication between the applications and the servers passes through respective APIs 78 of the OS platform, and is mediated by the kernel 80 of the OS.

In the example shown in FIG. 4, also consider that application 1 54a is operating in a proper manner, attempting to read and/or write files to memory (e.g., non-volatile memory 52) of the terminal 10, such as into a contact database or phonebook, as represented by session 128. Application 2 54b, on the other hand, is a malicious application that also attempts to read and/or write files to memory, as represented by session 130, which the terminal user previously downloaded to the terminal. During installation, the installer application 85 is likely to verify the authenticity of application 1. But being a malicious application, installer application may fail to verify the authenticity of application 2, and thus prevent installation of application 2. Consider, however, that the installer application also successfully verifies the authenticity of application 2. In this instance, the installer application installs both applications, and creates and stores a permission record for both applications.

As the installer application 85 creates the permission record for malicious application 2 54b, the permission record of application 2 may only include the default permissions, which may be selected to only include services incapable of abusing the terminal in any manner meaningful to the terminal user. Also, during creation of the permission record, application 2 may request authorization to receive one or more services that facilitate malicious operation of application 2. As with other permissions received or otherwise provided by applications, the installer application can request that the terminal user confirm the received permissions before inserting those permissions into the permission record. The terminal user can then recognize application 2 as a malicious application, or recognize application 2 does not need the services for which authorization is requested, and deny authorization for those services.

After the installer application 85 installs application 1 54a and application 2 54b, either application 54 may be operated on the terminal 10. During operation, application 1 is likely to request services that application 1 is authorized to receive, as reflected in the permission record for application 1, such as requesting/receiving a service over session 128. Malicious application 2, on the other hand, may be rendered benign by application of the permission record of application 2 before the OS platform provides any services to application 2. In this regard, if application 2 requests a service not included in the permissions of the respective permission record, such as requesting write access to system files over session 130, the validation module 88 prevents application 2 from receiving the requested service. Application 2 may be authorized to receive other services per the permission record, but typically only those services incapable of abusing the terminal in any manner meaningful to the terminal user, as indicated above.

According to one aspect of the present invention, all or a portion of the system of the present invention, such all or portions of the terminal 10, generally operate under control of one or more computer program products (e.g., software applications 54, OS platform including the server(s) 76, API(s) 78, kernel 80, installer application 85, policy database 84, management application 86 and validation module 88, etc.). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 5, 6a and 6b are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
   a processor; and
   a memory including computer program code, the memory and computer program code configured to, with the processor, cause the apparatus to at least:
   verify an authenticity of a software application, and in an instance in which the authenticity of the software application is verified: (a) install the software application for operation on the apparatus above an operating system platform of the apparatus, (b) create a permission record for the software application, and (c) cause the permission record to be stored, wherein the memory and computer program code are configured to, with the processor, cause the apparatus to create the permission record by inserting at least one permission into the permission record for the software application in an instance in which the at least one permission is received from the software application and confirmation of the at least one permission received from the software application is provided by a user of the apparatus, the permission record including a signature and at least one permission that identifies at least one service that the user of the apparatus has authorized the software application to receive from the operating system platform after the software application is executed for operation and while operating on the apparatus;
   receive, from the software application, a request for a service of the operating system platform, the request being received after the software application is executed for operation and while operating on the apparatus;
   determine if the software application is authorized to receive the requested service based upon the associated permission record; and
   cause the requested service to be provided to the software application in an instance in which the software application is authorized.

2. An apparatus according to claim 1, wherein the apparatus being caused to create the permission record further comprises the apparatus being caused to:
   request that the user of the apparatus confirm the at least one permission received from the software application; and
   deny insertion of the at least one permission into the permission record in an instance in which the user does not confirm the respective at least one permission.

3. An apparatus according to claim 1, wherein the memory and computer program code are further configured to, with the processor, cause the apparatus to further:
   receive, from the user, an indication of an addition of a permission to the permission record, deletion of a permission from the permission record, or modification of a permission of the permission record; and in response thereto,
   modify the permission record in accordance with the indication, the at least one permission of the permission record thereby being modifiable by the user.

4. An apparatus according to claim 1, wherein the apparatus being caused to verify the authenticity of the software application comprises the apparatus being caused to authenticate a source of the software application.

5. An apparatus according to claim 1, wherein the signature comprises a hash of a file name of the software application.

6. An apparatus according to claim 1, wherein the at least one permission is locally confirmable or modifiable by the user of the apparatus.

7. An apparatus according to claim 1, wherein the permission record includes a signature generated by the operating system platform.

8. A method comprising:
   verifying, with a processor, an authenticity of a software application, and in an instance in which the authenticity of the software application is verified: (a) installing the software application for operation above an operating system platform of an apparatus, (b) creating a permission record for the software application, and (c) causing the permission record to be stored, wherein creating the permission record comprises inserting at least one permission into the permission record for the software application in an instance in which the at least one permission is received from the software application and confirmation of the at least one permission received from the software application is provided by a user of the apparatus, the permission record including a signature and at least one permission that identifies at least one service that the user has authorized the software application to receive from the operating system platform after the software application is executed for operation and while operating;
   receiving, from the software application, a request for a service of the operating system platform, the request being received after the software application is executed for operation and while operating;
   determining if the software application is authorized to receive the requested service based upon the associated permission record; and causing the requested service to be provided to the software application in an instance in which the software application is authorized.

9. A method according to claim 8, wherein creating the permission record further comprises:
  requesting that the user confirm the at least one permission received from the software application; and
  denying insertion of the at least one permission into the permission record in an instance in which the user does not confirm the respective at least one permission.

10. A method according to claim 8, further comprising:
  receiving, from the user, an indication of an addition of a permission to the permission record, deletion of a permission from the permission record, or modification of a permission of the permission record; and in response thereto,
  modifying the permission record in accordance with the indication, the at least one permission of the permission record thereby being modifiable by the user.

11. A method according to claim 8, wherein verifying the authenticity of the software application comprises authenticating a source of the software application.

12. A method according to claim 8, wherein the signature comprises a hash of a file name of the software application.

13. A method according to claim 8, wherein the at least one permission is locally confirmable or modifiable by the user.

14. A method according to claim 8, wherein the permission record includes a signature generated by the operating system platform.

15. A computer program product comprising at least one non-transitory computer-readable storage medium having computer-readable program code portions stored therein, the computer-readable storage medium and computer-readable program code portions being configured to, with a processor, cause an apparatus to at least:
  verify an authenticity of a software application, and in an instance in which the authenticity of the software application is verified, (a) install the software application for operation above an operating system platform, (b) create a permission record for the software application, and (c) cause the permission record to be, wherein the computer-readable program code portions that are configured to create the permission record comprise computer-readable program code portions that are configured to, with the processor, cause the apparatus to insert at least one permission into the permission record for the software application in an instance in which the at least one permission is received from the software application and confirmation of the at least one permission received from the software application is provided by a user of the apparatus, the permission record including a signature and at least one permission that identifies at least one service that the user of the apparatus has authorized the software application to receive from the operating system platform after the software application is executed for operation and while operating on the apparatus;
  receive, from the software application, a request for a service of the operating system platform, the request being received after the software application is executed for operation and while operating on the apparatus;
  determine if the software application is authorized to receive the requested service based upon the associated permission record; and
  cause the requested service to be provided to the software application in an instance in which the software application is authorized.

16. A computer program product according to claim 15, wherein the apparatus being caused to create the permission record further comprises the apparatus being caused to:
  request that the user of the apparatus confirm the at least one permission received from the software application; and
  deny insertion of the at least one permission into the permission record in an instance in which the user does not confirm the respective at least one permission.

17. A computer program product according to claim 15, wherein the computer-readable storage medium and computer-readable program code portions are further configured to, with the processor, cause the apparatus to further:
  receive, from the user, an indication of an addition of a permission to the permission record, deletion of a permission from the permission record, or modification of a permission of the permission record; and in response thereto,
  modify the permission record in accordance with the indication, the at least one permission of the permission record thereby being modifiable by the user.

18. A computer program product according to claim 15, wherein the apparatus being caused to verify the authenticity of the software application comprises the apparatus being caused to authenticate a source of the software application.

19. A computer program product according to claim 15, wherein the at least one permission is locally confirmable or modifiable by the user of the apparatus.

20. A computer program product according to claim 15, wherein the permission record includes a signature generated by the operating system platform.

* * * * *